United States Patent
Olszewski et al.

(10) Patent No.: US 8,639,909 B2
(45) Date of Patent: *Jan. 28, 2014

(54) MANAGEMENT OF LOW-PAGING SPACE CONDITIONS IN AN OPERATING SYSTEM

(71) Applicant: International Business Machines Corporation, Armonk, NY (US)

(72) Inventors: Bret R. Olszewski, Austin, TX (US); Basu Vaidyanathan, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/774,362

(22) Filed: Feb. 22, 2013

(65) Prior Publication Data

US 2013/0166873 A1    Jun. 27, 2013

Related U.S. Application Data (63) Continuation of application No. 12/875,831, filed on Sep. 3, 2010, now Pat. No. 8,417,912.

(51) Int. Cl.
    *G06F 13/00*      (2006.01)
    *G06F 13/28*      (2006.01)

(52) U.S. Cl.
    USPC ............................ 711/173; 711/172; 711/170

(58) Field of Classification Search
    USPC .................................................. 711/170–173
    See application file for complete search history.

(56) References Cited

U.S. PATENT DOCUMENTS

| | | | |
|---|---|---|---|
| 5,627,995 A * | 5/1997 | Miller et al. .................. | 711/171 |
| 5,752,275 A | 5/1998 | Hammond | |
| 6,038,646 A | 3/2000 | Sproull | |
| 6,378,059 B1 | 4/2002 | Miyoshi | |
| 6,516,399 B2 | 2/2003 | Vishal | |
| 6,519,637 B1 * | 2/2003 | Arkeketa et al. .............. | 709/223 |
| 6,678,815 B1 | 1/2004 | Mathews et al. | |
| 7,240,177 B2 * | 7/2007 | Hepkin et al. ................. | 711/173 |
| 7,389,402 B2 | 6/2008 | Zuraski, Jr. et al. | |
| 7,653,799 B2 * | 1/2010 | Hepkin et al. ................. | 711/171 |
| 7,917,710 B2 * | 3/2011 | Freeman et al. .............. | 711/156 |

(Continued)

FOREIGN PATENT DOCUMENTS

EP      0533190      3/1993

OTHER PUBLICATIONS

"U.S. Appl. No. 12/875,831 Office Action", Aug. 20, 2012, 48 pages.

(Continued)

*Primary Examiner* — Matthew Bradley
*Assistant Examiner* — Rocio Del Mar Perez-Velez
(74) *Attorney, Agent, or Firm* — DeLizio Gilliam, PLLC (57) ABSTRACT

A virtual memory management unit can implement various techniques for managing paging space. The virtual memory management unit can monitor a number of unallocated large sized pages and can determine when the number of unallocated large sized pages drops below a page threshold. Unallocated contiguous smaller-sized pages can be aggregated to obtain unallocated larger-sized pages, which can then be allocated to processes as required to improve efficiency of disk I/O operations. Allocated smaller-sized pages can also be reorganized to obtain the unallocated contiguous smaller-sized pages that can then be aggregated to yield the larger-sized pages. Furthermore, content can also be compressed before being written to the paging space to reduce the number of pages that are to be allocated to processes. This can enable efficient management of the paging space without terminating processes.

17 Claims, 5 Drawing Sheets

(56) References Cited

U.S. PATENT DOCUMENTS

| | | |
|---|---|---|
| 2002/0073164 A1* | 6/2002 | Hagersten et al. ............ 709/215 |
| 2006/0277389 A1* | 12/2006 | Hepkin et al. ................ 711/203 |
| 2007/0043551 A1 | 2/2007 | Ezra et al. |
| 2008/0288742 A1* | 11/2008 | Hepkin et al. ................ 711/201 |
| 2011/0087857 A1 | 4/2011 | Bomma et al. |
| 2011/0153978 A1 | 6/2011 | Chalemin et al. |
| 2012/0060012 A1 | 3/2012 | Olszewski et al. |

* cited by examiner

MANAGEMENT OF LOW-PAGING SPACE CONDITIONS IN AN OPERATING SYSTEM

RELATED APPLICATIONS

This application claims the priority benefit of U.S. of America application Ser. No. 12/875,831 filed Sep. 3, 2010.

BACKGROUND

Embodiments of the inventive subject matter generally relate to the field of memory management and, more particularly, to management of low paging space conditions in an operating system.

Operating systems implement memory management by virtualizing memory units of a computer (e.g., random access memory (RAM), hard disk space, external memory units, etc.) to enable a program to access the memory units as if there was only one hardware memory unit. A virtual memory manager of the operating system maintains a subset of the hard disk space for temporarily storing content for which physical memory (i.e., the RAM) is not available. This subset of the hard disk space is also known as paging space. The virtual memory manager swaps content from the physical memory to the paging space when not in use and swaps the content from the paging space back into the physical memory when in use. The content is typically read to or written from the paging space in the form of blocks of contiguous paging space also called pages. Such a memory management technique (also referred to as virtual memory management) allows total memory content of processes executing on the computer to exceed the total physical memory and allows the processes to use the physical memory only when the processes execute. Typically, the operating system attempts to free up (or de-allocate) pages from the processes before all the available pages can be allocated and before the operating system can run out of available memory to avoid deadlocks that cause the operating system to freeze/crash. For example, the operating system can terminate a process to which a large number of pages are allocated, to maintain operating system stability.

SUMMARY

Various embodiments for management of low paging space conditions in an operating system are disclosed. In one embodiment, it is determined that a number of unallocated pages of a first page size supported by an operating system is less than a page threshold. The page threshold corresponds to insufficient unallocated paging space available to the operating system. It is determined that a first number of unallocated contiguous pages of a second page size supported by the operating system is less than a page conversion factor that indicates a number of pages of the second page size that is equivalent to one page of the first page size. At least one process to which at least a second number of allocated pages of the second page size is allocated is identified. The second number corresponds to a difference between the page conversion factor and the first number and the allocated pages are contiguous with the unallocated contiguous pages. The allocated pages of the second page size are reorganized. The allocated pages of the second page size are aggregated with the unallocated contiguous pages of the second page size to create at least a first unallocated page of the first page size.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to techniques for page management in an operating system that supports two page sizes (i.e., a 64 KB page size and a 4 KB page size), embodiments can be implemented in operating systems that support any suitable number of page sizes. In other instances, well-known instruction instances, protocols, structures, and techniques have not been shown in detail in order not to obfuscate the description.

To allocate paging space to a process, a virtual memory manager of an operating system that supports multiple page sizes can either allocate a large segment of the paging space to the process or allocate smaller non-contiguous segments of the paging space to the process. For example, in an operating system that supports 4 KB pages and 64 KB pages, a request for 64 KB of paging space can be satisfied by a single allocation of one 64 KB page (i.e., mapping a 64 KB page to a contiguous segment of 64 KB of the paging space) or by an allocation of sixteen 4 KB pages (e.g., mapping a 64 KB page to sixteen 4 KB non-contiguous sections of the paging space). However, allocating a large number of fragmented small-sized pages in lieu of a smaller number of large-sized pages is very inefficient especially in terms of executing input/output (I/O) operations such as reading the page from the paging space to physical memory (i.e., RAM) or writing the page from the physical memory to the paging space. This also increases overhead associated with the I/O operations. For example, content of the 64 KB page can be read from or written to the paging space in one disk I/O operation. The content if allocated to sixteen 4 KB pages may be read from or written to the paging space in up to sixteen disk I/O operations, which would result in a longer execution time and additional overhead. This can also result in energy inefficiency or higher energy consumption. Furthermore, the virtual memory manager may not be equipped to efficiently handle low paging space conditions. Some implementations of virtual memory managers attempt to terminate one or more processes on detecting low paging space conditions, which can lead to poor user experience.

The virtual memory manager can be configured to allocate pages to processes so that the pages allocated to a process can be accessed in a fewer number of disk I/O operations. The virtual memory manager can track the number of unallocated pages of each page size available to the operating system. On determining that the number of large-sized pages is greater than a page threshold, the virtual memory manager can identify allocated smaller sized pages that can be aggregated to obtain unallocated large-sized pages. The virtual memory manager can reorganize paging space to obtain unallocated segments of the paging space that correspond to large-sized pages, in effect creating unallocated large-sized pages. The virtual memory manager can also consider the total number of unallocated pages available to the operating system as an indication of unallocated paging space available to the operating system. If the paging space cannot be reorganized and/or on encountering a low paging space condition, the virtual memory manager can compress content before writing the content to the paging space in an attempt to use/allocate fewer pages. Such a process for paging space management can improve the efficiency of disk I/O operations and can allow for efficient management of the paging space without terminating processes.

Figure 1:
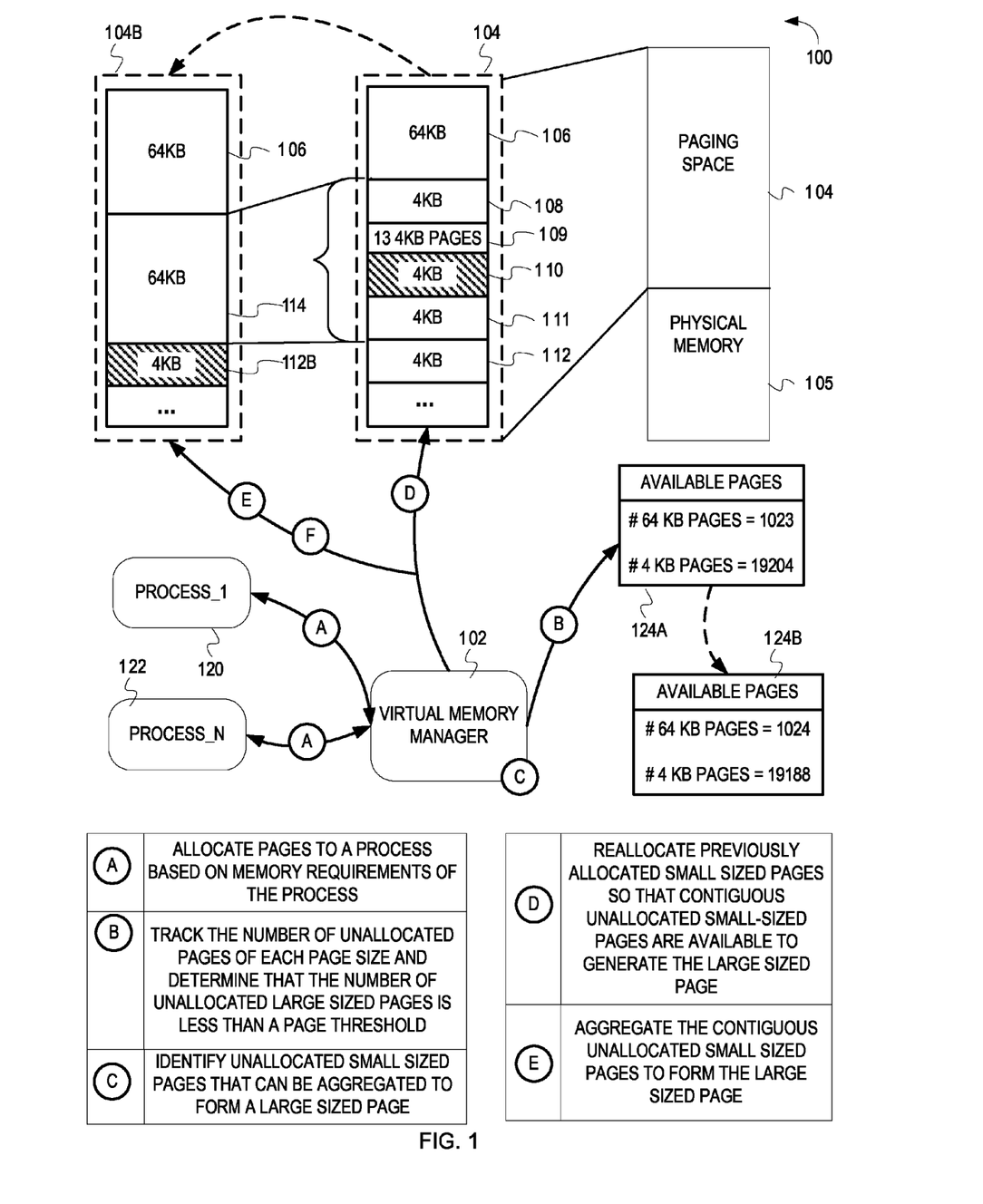
FIG. 1 is a conceptual diagram illustrating example operations for page size management.

FIG. 1 is a conceptual diagram illustrating example operations for page size management. FIG. 1 depicts a computer system 100 comprising a virtual memory manager 102, physical memory 105, and paging space 104. The paging space 104 is divided into either 4 KB or 64 KB pages which may be unallocated or allocated to a process. Unallocated pages 106, 108, 109, 111, and 112 are unshaded, while the allocated page 110 is shaded with hatched lines. The virtual memory manager 102 manages memory allocation to the processes 120 and 122 of the computer system 100. Various events can trigger operations described herein for management of low paging space. In one example, a process (e.g., the process 120) may request a new page and the virtual memory manager 102 may determine whether sufficient paging space 104 exists to create the new page. As another example, a process may need to be loaded into the physical memory 105 and the virtual memory manager 102 may need to de-allocate currently allocated physical memory 105 to load the new process. The virtual memory manager 102 may determine whether a sufficient number of pages (and consequently paging space 104) exists for writing infrequently used content from the physical memory 105 to the paging space 104. In FIG. 1, the virtual memory manager 102 reorganizes page allocations to the processes 120 and 122 to address low paging space conditions and to enable pages allocated to the processes 120 and 122 to be accessed using a minimum number of disk I/O operations as will be described in stages A-E.

At stage A, the virtual memory manager 102 allocates pages to the processes 120 and 122 based on memory requirements of the processes 120 and 122. In FIG. 1, the operation system supports two page sizes—a 64 KB (i.e., 65536 bytes) page size and a 4 KB (i.e., 4096 bytes) page size. In one implementation, the process 120 transmits a request for a requisite number of pages to the virtual memory manager 102. For example, the process 120 may indicate that it requires ten 4 KB pages. In another implementation, the process 120 can indicate an amount of memory required and the virtual memory manager 102 can determine how many pages to allocate to the process 120. Based on the availability of pages, the virtual memory manager 102 can allocate the requisite number of pages to the process. For example, the process 120 may transmit a request for 68 KB of memory and the virtual memory manager may allocate one 64 KB page and one 4 KB page to the process. As another example, the virtual memory manager may allocate seventeen 4 KB pages (e.g., seventeen non-contiguous 4 KB allocations of the paging space) to the process. Additionally, the virtual memory manager 102 maintains a free list (not shown) to keep track of a number of pages of each page size that are currently unallocated. The virtual memory manager 102 also maintains a page allocation map (not shown) to keep track of pages that are allocated to each of the processes 120 and 122 executing on the computer system 100 and to identify a number and size of pages that are allocated to each of the processes 120 and 122.

At stage B, the virtual memory manager 102 tracks the number of unallocated pages of each page size. As depicted in FIG. 1, the virtual memory manager 102 maintains an available pages structure 124A to track the number of unallocated 64 KB pages and the number of unallocated 4 KB pages. As the virtual memory manager 102 allocates pages to the processes 120 and 122 or de-allocates pages from the processes 120 and 122, the virtual memory manager 102 updates the number of unallocated 64 KB and 4 KB pages in the available pages structure 124A. As depicted in FIG. 1, the available pages structure 124A indicates that the operating system comprises 1023 unallocated 64 KB pages and 19204 unallocated 4 KB pages. Each time the virtual memory manager 102 allocates or de-allocates page(s), the virtual memory manager 102 also compares the number of unallocated 64 KB pages against a page threshold to determine whether the number of unallocated 64 KB pages is less than the page threshold. The number of unallocated 64 KB and 4 KB pages can serve as an indication of available paging space 104. The number of unallocated 64 KB pages being less than the page threshold can indicate possible inefficiency of disk I/O operations. As described above, by maintaining and allocating 64 KB pages (instead of multiple fragmented 4 KB pages), the number of disk I/O operations executed for reading content from or writing content to the paging space 104 can be minimized. In one implementation, the operating system may configure a default page threshold. The page threshold may be a function of the total amount of paging space 104 and the total amount of physical memory 105 of the computer system 100. In another implementation, a system administrator may manually configure the page threshold. The page threshold may be updated (either automatically or manually) if paging space is added to or removed from the computer system 100 and/or if physical memory is added to or removed from the computer system 100. At stage B, the virtual memory manager 102 compares the number of unallocated large-sized pages (e.g., the unallocated 64 KB pages) against the page threshold and determines that the number of unallocated large-sized pages is less than the page threshold. The virtual memory manager 102 attempts to reorganize page allocations and obtain a sufficient number of contiguous unallocated small-sized pages (in other words, sufficient contiguous unallocated paging space) to yield large-sized pages as will be described in stage C.

At stage C, the virtual memory manager 102 identifies contiguous unallocated small-sized pages that can be aggregated to form a large-sized page. The virtual memory manager 102 can determine whether at least a minimum number of small-sized pages that should be aggregated to form a large-sized page can be identified. The virtual memory manager 102 can access a known memory location to determine the minimum number of small-sized pages that should be aggregated to form the large-sized page. In FIG. 1, because sixteen 4 KB pages can be aggregated to form a 64 KB page, the virtual memory manager 102 attempts to identify at least sixteen contiguous unallocated 4 KB pages, on determining that the number of unallocated 64 KB pages is less than the page threshold. The virtual memory manager 102 traverses the free list and the page allocation map and identifies contiguous unallocated small-sized pages that can be aggregated to create the large-sized page. The virtual memory manager 102 compares the identified contiguous unallocated small-sized pages against the minimum number of small-sized pages that should be aggregated to form the large-sized page. If the minimum number of contiguous small-sized pages cannot be identified, the virtual memory manager 102 identifies one or more processes to which contiguous pages are allocated from the page allocation map. For example, if the virtual memory manager 102 cannot identify sixteen contiguous unallocated 4 KB pages, the virtual memory manager 102 can attempt to reorganize page allocations to obtain sixteen contiguous unallocated 4 KB pages. In FIG. 1, the virtual memory manager 102 determines that unallocated 4 KB pages 108 and 111, a set of thirteen unallocated 4 KB pages 109, and allocated 4 KB page 110 can be aggregated to form a 64 KB page. The 4 KB page 110 is represented by hatched lines to indicate that the page 110 is currently allocated to a process. As will be described in stage D, the virtual memory manager 102 re-organizes pages to de-allocate paging space associated with the page 110. Furthermore, as will be described in FIG. 4, if the virtual memory manager 102 is unable to identify at least the minimum number of contiguous unallocated small-sized pages to obtain a large-sized page or is unable to reorganize the allocated small-sized pages to obtain at least the minimum number of contiguous unallocated 4 KB pages, the virtual memory manager 102 can compress content to be written to the paging space 104 and can thus allocate a fewer number of pages to the process. The virtual memory manager 102 may, also terminate one or more processes to obtain at least the minimum number of contiguous unallocated small-sized pages if the small-sized pages cannot be reorganized and/or if an insufficient number of unallocated pages are available for the compressed content.

At stage D, the virtual memory manager 102 reallocates previously allocated small-sized pages so that contiguous unallocated small-sized pages are available to generate the large-sized page. The virtual memory manager 102 can analyze the page allocation map to identify one or more processes from which one or more small-sized pages can be de-allocated to obtain contiguous unallocated small-sized pages and consequently the large-sized pages. In FIG. 1, the virtual memory manager 102 can analyze the page allocation table and determines that the 4 KB page 110 is allocated to the process 122. The virtual memory manager 102 determines whether content corresponding to the allocated page 110 that maps to the paging space 104 is already present in the physical memory 105. In other words, the virtual memory manager 102 determines whether two copies of the content are stored—one in the paging space 104 and one in the physical memory 105. If so, the virtual memory manager 102 deletes the content from the paging space 104 and de-allocates the page 110 from the process 122.

However, if the virtual memory manager 102 determines that the content corresponding to the allocated page 110 does not exist in the physical memory 105 (i.e., only one copy of the content is stored in the paging space 104), the virtual memory manager 102 re-organizes paging space allocations. In FIG. 1, the virtual memory manager 102 determines that the content of the allocated page 110 can be allocated to the currently unallocated page 112 instead of the page 110. Therefore, the virtual memory manager 102 de-allocates the page 110 from the process 122 and allocates the page 112 to the process 122. For this, the virtual memory manager 102 can read the content from a first subset of the paging space 104 that corresponds to the allocated page 110 into the physical memory 105. The virtual memory manager 102 can identify a second subset of the paging space 104 that is currently unallocated (i.e., the page 112) and can write the content from the physical memory 105 to the second subset of the paging space 104. Thus, the virtual memory manager 102 can de-allocate the first subset of the paging space 104 previously allocated to the process 122. As depicted by paging space 104B, page 112B represents the state of the page 112 after the page 112 is allocated to the process 122 and is hatched to indicate that the page 112B is allocated to the process 122. The paging space 104B represents the state of the paging space 104 after the virtual memory manager 102 reorganizes pages to de-allocate the page 110 from the process 122 and to instead allocate the page 112 to the process 122. Although not depicted in FIG. 1, in the paging space 104B, the page 110 is de-allocated from the process 122. The virtual memory manager 102 can update the free list to indicate that the page 110 is de-allocated from the process 122. The virtual memory manager 102 can also update the page allocation map to indicate that the page 112 is allocated to the process 122. Thus, in the paging space 104B, the pages 108, 110, 111, and the set of pages 109 represent sixteen contiguous unallocated 4 KB pages that can be aggregated to form a 64 KB page as will be described in stage E.

At stage E, the virtual memory manager 102 aggregates the contiguous unallocated small-sized pages to form the large-sized page. As depicted by the paging space 104B, in reorganizing the pages at stage D, the virtual memory manager 102 obtains sixteen unallocated 4 KB pages 108, 109, 110, and 111. The virtual memory manager 102 aggregates the contiguous unallocated 4 KB pages 108, 109, 110, and 111 to form an unallocated 64 KB page 114. The virtual memory manager 102 can update pointers associated with the 4 KB pages 108, 109, 110, and 111 to indicate that the 4 KB pages 108, 109, 110, and 111 are aggregated to form the 64 KB page 114. The virtual memory manager 102 may also update the free list to indicate that the 64 KB page 114 is unallocated. Additionally, the virtual memory manager 102 can also update the available pages structure 124A to reflect the number of unallocated 64 KB pages and the number of unallocated 4 KB pages (depicted by the updated available pages structure 124B). As depicted by the available pages structure 124B, the number of unallocated 64 KB pages is incremented by one, while the number of unallocated 4 KB pages is decremented by sixteen.

Although not depicted in FIG. 1, the virtual memory manager 102 may compress content before writing the content to the paging space 104 (i.e., before allocating pages to the process that generated the content) in an effort to allocate a fewer number of pages to the process. In some implementations, the virtual memory manager 102 may compress the content prior to writing the content to the paging space if A) the number of unallocated large-sized pages is less than the page threshold and B) a sufficient number of contiguous unallocated small-sized pages cannot be aggregated to create large-sized-pages to cause the number of unallocated large-sized pages to exceed the page threshold. In another implementation, the virtual memory manager 102 may compress the content prior to writing to the content to the paging space 104 if the number of unallocated large-sized pages is less than a first page threshold and/or if the number of unallocated small-sized pages is less than a second page threshold. In another implementation, the virtual memory manager 102 may compress the content prior to writing to the content to the paging space 104 if the total number of unallocated pages (i.e., the total amount of unallocated paging space, irrespective of large-sized or small-sized pages) is less than a paging space threshold. In another implementation, the virtual memory manager 102 may always compress the content prior to writing the content to the paging space 104. Operations for compressing the content prior to writing to the content to the paging space 104 are further described with reference to FIG. 4.

It is noted that although not depicted in FIG. 1, in some implementations, the virtual memory manager 102 may determine that previously allocated small-sized pages cannot be reorganized to obtain a contiguous set of unallocated small-sized pages. For example, the virtual memory manager 102 may determine that the allocated page 110 cannot be de-allocated from the process 122 (e.g., because a new page for re-allocation to the process 122 is not available). If the virtual memory manager 102 also determines that a sufficient number of pages are not available for allocation for compressed content, the virtual memory manager 102 may terminate the process 122 to de-allocate the page 110 (and other pages allocated to the process 122). In one implementation, the virtual memory manager 102 may implement a series of page thresholds. The virtual memory manager 102 can attempt to reorganize unallocated small-sized pages to obtain unallocated large-sized pages if the total number of unallocated pages (i.e., unallocated paging space) is less than a first page threshold. The virtual memory manager 102 can attempt to compress content prior to writing the content to the paging space 104 if the total number of unallocated pages drops below a second page threshold. The virtual memory manager 102 can terminate one or more processes to de-allocate paging space allocated to the one or more processes if the total number of unallocated pages drops below a third page threshold.

It is also noted that although FIG. 1 depicts the virtual memory manager 102 de-allocating a single 4 KB page 110 allocated to the process 122, embodiments are not so limited. For example, the pages 108 and 109 may be allocated to a first process and the pages 110 and 111 may be allocated to a second process. On determining that the number of 64 KB pages is less than the page threshold, the virtual memory manager 102 may determine that the 4 KB pages allocated to the first and the second processes can be aggregated can yield a 64 KB page. Accordingly, as described above, the virtual memory manager 102 can attempt to reorganize the pages allocated to the first and the second process to de-allocate the pages 108, 109, 110, and 111 and to allocate equal number of currently unallocated pages to the first and the second processes. As part of the reorganization operations, the virtual memory manager 102 may also compress the content so as to allocate a fewer number of pages to the process. In other words, the virtual memory manager 102 may determine that six pages are currently allocated to the process. The virtual memory manager 102 may compress the content so that the compressed content now requires only three pages. The virtual memory manager 102 may allocate a new set of three pages to the process and may de-allocate the previously allocated six pages from the process.

Figure 2:
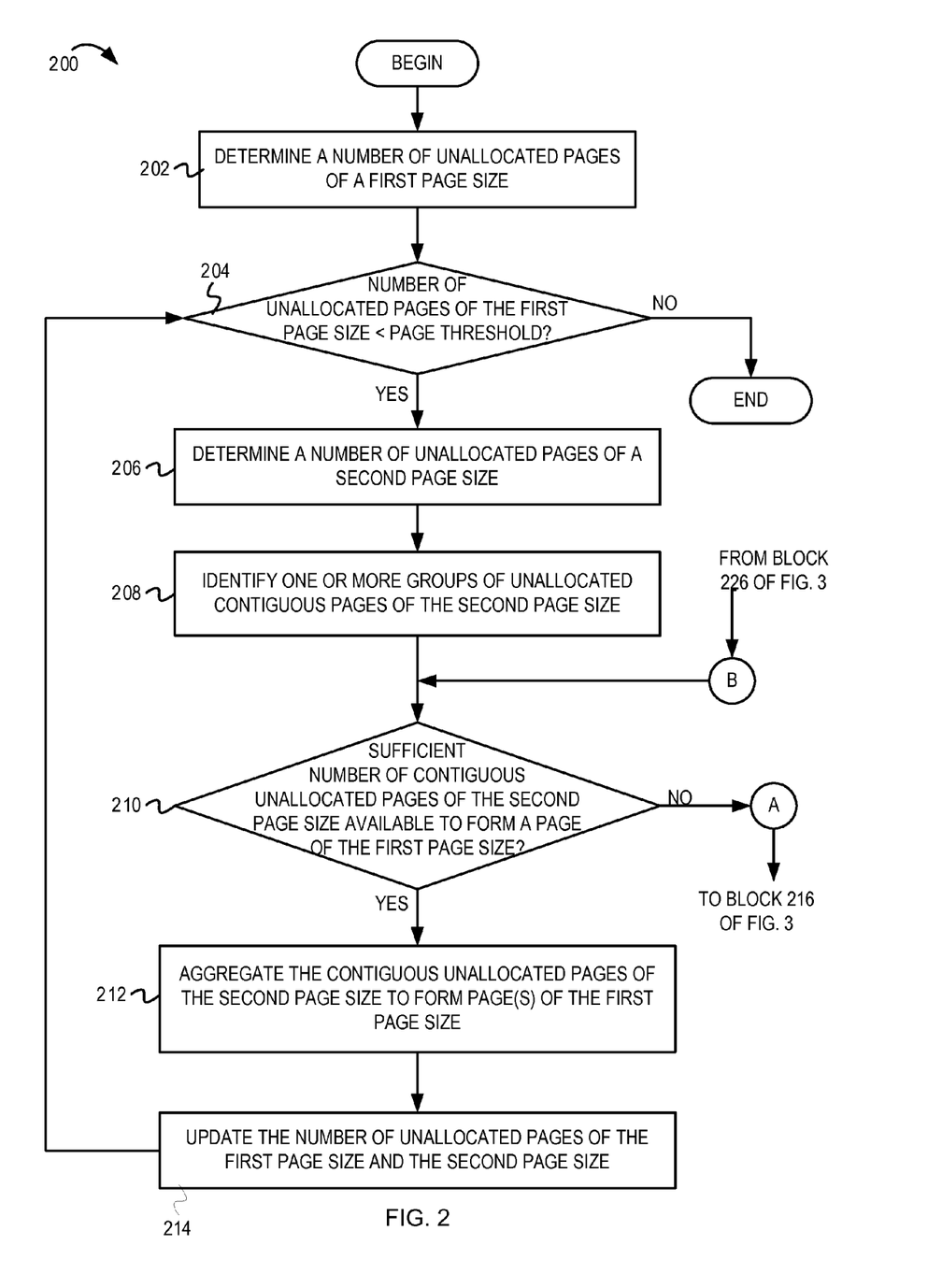
FIG. 2 is a flow diagram illustrating example operations for page management in low paging space conditions.
Figure 3:
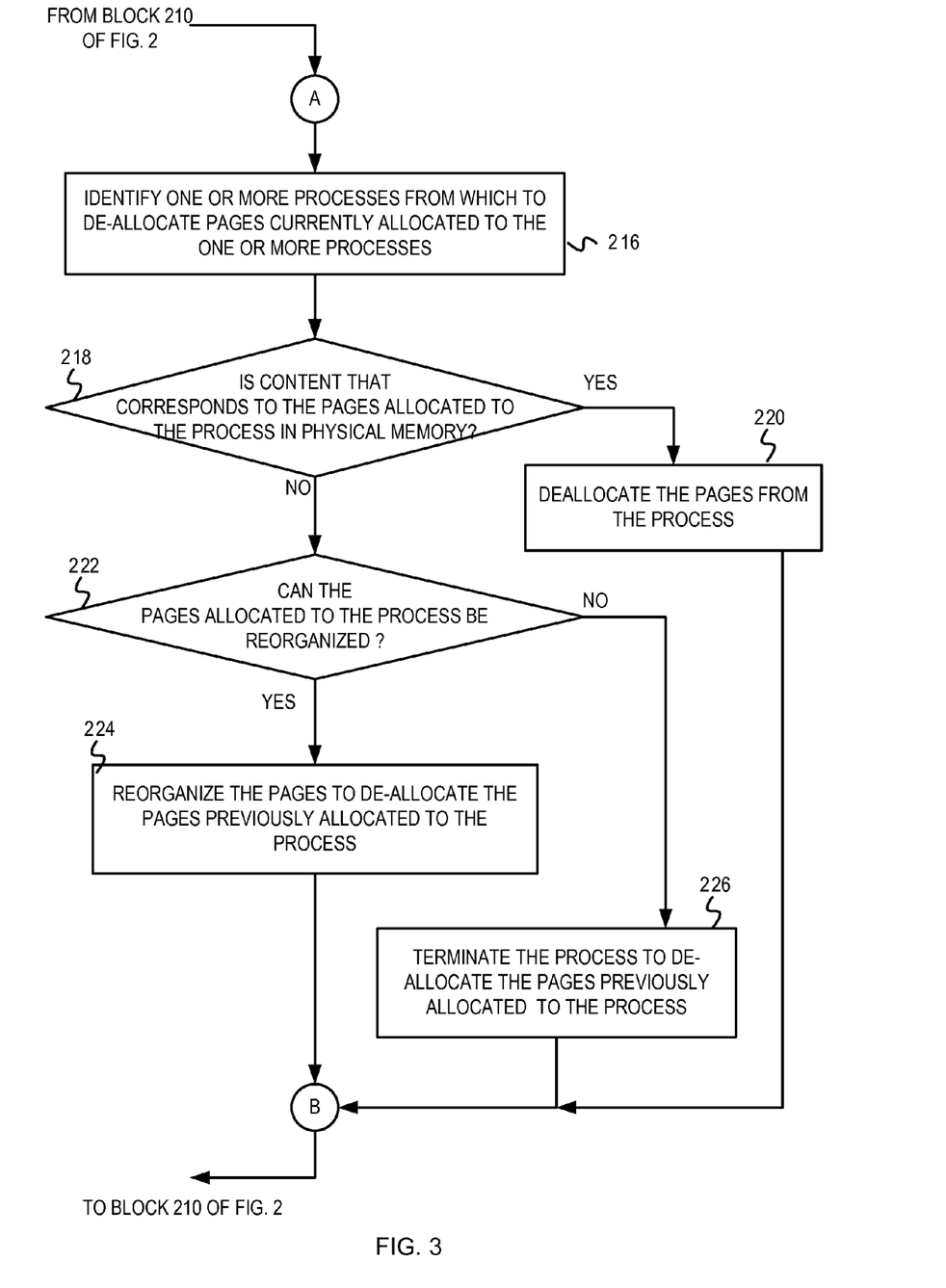
FIG. 3 is a continuation of FIG. 2 and illustrates example operations for reorganizing pages for page management in low paging space conditions.

FIG. 2 and FIG. 3 depict a flow diagram illustrating example operations for page management in low paging space conditions. Flow 200 begins at block 202 in FIG. 2.

A number of unallocated pages of a first page size is determined (202). In an operating system that supports multiple page sizes, a virtual memory manager (e.g., the virtual memory manager 102 of FIG. 1) can maintain an available pages structure 124A to track the number of pages of each page size. The first page size may be the largest page size supported by the operating system. For example, if the operating system supports 64 KB pages and 4 KB pages, the number of unallocated 64 KB pages may be determined at block 202. The flow continues at block 204.

It is determined whether the number of unallocated pages of the first page size is less than a page threshold (204). In one implementation, the page threshold may be configured by the operating system and may be based on a total amount of paging space and a total amount of physical memory available to a computer system that hosts the operating system and the virtual memory manager. In another implementation, the page threshold may be manually configured. The page threshold may be reconfigured if physical memory and/or paging space is added to or removed from the computer system. For example, on detecting the paging space has been added to the computer system, the operating system can recalculate and determine a new page threshold to reflect the added paging space. The page threshold can indicate a minimum acceptable (based on efficiency of disk I/O operations, requisite operating system performance, etc.) number of unallocated pages of the first page size. It is noted that the number of unallocated pages of the first page size being less than the page threshold need not imply that the paging space (i.e., a subset of hard disk storage allocated for virtualization operations) available at the computer system is almost depleted. The number of unallocated pages of the first page size being less than the page threshold can indicate a possible inefficiency of disk I/O operations. Consequently, as will be described below, the virtual memory manager can attempt to aggregate smaller-sized pages into large-sized pages and to allocate the larger-sized pages to processes in lieu of multiple (possibly fragmented) smaller sized pages to improve the efficiency of the disk I/O operations. If it is determined that the number of unallocated pages of the first page size is less than the page threshold, the flow continues at block 206. Otherwise, the flow ends.

A number of unallocated pages of a second page size is determined (206). The available pages structure can be accessed to determine the number of unallocated pages of the second page size. The second page size supported by the operating system is typically smaller than the first page size. For example, if the operating system supports 64 KB pages and 4 KB pages, the number of unallocated 4 KB pages may be determined at block 206. The flow continues at block 208.

One or more groups of unallocated contiguous pages of the second page size are identified (208). A free list associated with the second page size may be accessed to identify the unallocated pages of (i.e., unallocated segments of the paging space that correspond to) the second page size. The flow continues at block 210.

It is determined whether a sufficient number of contiguous unallocated pages of the second page size are available to form a page of the first page size (210). Based on the first page size and the second page size, it may be determined whether at least N pages of the second page size are available. N can represent a number of pages of the second page size that are to be aggregated to obtain a page of the first page size. For example, if the first page size is 32 KB and the second page size is 4 KB, N is eight because eight 4 KB pages are to be aggregated to form a 32 KB page. In one implementation, the number of contiguous unallocated pages of the second page size required to form a page of the first page size may be pre-calculated, and stored in an appropriate memory location, based on knowledge of the page sizes supported by the operating system. For example, if the first page size is 64 KB and the second page size is 4 KB, a first memory location can be accessed to determine that at least sixteen contiguous 4 KB pages are to be identified to form a 64 KB page. As another example, if the first page size is 64 KB and the second page size is 16 KB, a second memory location can be accessed to determine that at least four contiguous 16 KB pages are to be identified to form a 64 KB page. In another implementation, the number of contiguous unallocated pages of the second page size required to form a page of the first page size can be calculated each time by dividing the first page size by the second page size. If it is determined that a sufficient number of contiguous unallocated pages of the second page size are available to form an unallocated page of the first page size, the flow continues at block 212. Otherwise, the flow continues at block 216 in FIG. 3.

The contiguous unallocated pages of the second page size are aggregated to form page(s) of the first page size (212). The flow 200 moves from block 210 to block 212 if a sufficient number of contiguous unallocated pages of the second page size are identified. To aggregate the pages of the second page size, paging space that corresponds to the contiguous unallocated pages of the second page size is mapped to an appropriate number of pages of the first page size. For example, the virtual memory manager may identify sixteen contiguous unallocated pages of the second page size that correspond to sixteen contiguous subsets of the paging space. The virtual memory manager can create a page of the first page size and can map, in a page table, the page of the first page size to the sixteen contiguous subsets of the paging space. The virtual memory manager can then remove the mapping between the sixteen unallocated pages of the second page size and the sixteen contiguous subsets of the paging space. The virtual memory manager 102 may also update one or more free lists (e.g., a structure/linked list that identifies unallocated pages) to reflect the number of unallocated pages of the first page size and of the second page size. The flow continues at block 214.

The number of unallocated pages of the first page size and the second page size are updated (214). The available pages structure can be updated to increment the number of pages of the first page size and to decrement the number of pages of the second page size. For example, if thirty-two 4 KB pages were aggregated to form two 64 KB pages, the number of pages of the first page size in the available pages structure can be incremented by two and the number of pages of the second pages size can be decremented by thirty-two. The flow continues at block 204, where it is determined whether the updated number of unallocated pages of the first page size is less than the page threshold.

One or more processes from which to de-allocate currently allocated pages are identified (216). The flow 200 moves from block 210 in FIG. 2 to block 216 in FIG. 3 on determining that a sufficient number of contiguous unallocated pages of the second page size are not available to form a page of the first page size. In one embodiment, a page allocation map may be accessed to identify currently allocated small-sized pages that can be reorganized to obtain at least a minimum number of contiguous unallocated pages of the second page size. In FIG. 1, it is determined that one additional page (i.e., the allocated page 110) is required to obtain sixteen contiguous 4 KB pages to form the 64 KB page. The page allocation map may also indicate the process to which the page 110 is allocated. In another embodiment, a set of allocated pages that are contiguous to a set of unallocated pages of the second page size may be identified. Processes to which the identified set of allocated pages is allocated may be identified. For example, ten unallocated contiguous 4 KB pages may be identified from the free list. The page allocation map may be accessed to identify at least six 4 KB allocated pages that are contiguous to the ten unallocated contiguous 4 KB pages. One or more processes to which the six 4 KB pages are allocated may be identified from the page allocation map. In another embodiment, one or more processes to which at least a threshold number of small-sized pages are allocated may be identified. The flow continues at block 218.

For each of the identified processes, it is determined whether content that corresponds to the pages allocated to the process already exists in physical memory (218). In other words, it is determined whether a copy of the content (e.g., data generated by the process, instructions that constitute an instance of the process, etc.) is stored in the paging space and also in the physical memory. If it is determined that the content that corresponds to the pages allocated to the process already exists in the physical memory, the flow continues at block 220. Otherwise, the flow continues at block 222.

The pages are de-allocated from the process (220). The flow 200 moves from block 218 to block 220 on determining that the content that corresponds to the pages allocated to the process already exists in the physical memory. Because two copies of the content are available—a first copy in the paging space to which the pages are mapped and a second copy in the physical memory, the copy of the content in the paging space can be deleted and the pages (allocated to the process) that map to the paging space can be de-allocated from the process. The flow continues at block 210 in FIG. 2.

It is determined whether the pages allocated to the process can be reorganized (222). The flow 200 moves from block 218 to block 222 on determining that the content that corresponds to the pages allocated to the process does not exist in the physical memory. In determining whether the pages allocated to the process can be reorganized, it may be determined whether an equivalent number of unallocated pages are available. For example, to de-allocate a first set of ten contiguous 4 KB pages from a process, it may be determined whether there exist a second set of ten unallocated 4 KB pages (not necessarily contiguous) which can be allocated to the process to de-allocate the first set of ten contiguous 4 KB pages. In some implementations, if a fewer number of additional unallocated pages are available, it may be determined whether content that corresponds to the pages can be compressed. For example, with reference to the above example, if it is determined than only six unallocated 4 KB pages (instead of ten 4 KB pages) are available for allocation to the process, it may be determined whether the content that corresponds to the first set of ten contiguous 4 KB pages can be compressed into six 4 KB pages. If it is determined that the pages allocated to the processes can be reorganized, the flow continues at block 224. Otherwise, the flow continues at block 226.

The pages are reorganized to de-allocate the pages previously allocated to the process (224). The content that corresponds to the pages allocated to the process is read from a first subset of the paging space that maps to the allocated pages into physical memory. A second subset of unallocated paging space is identified and the content is written from the physical memory to the second subset of the paging space. The content is deleted from the first subset of the paging space. The first subset of the paging space and the previously allocated pages are now de-allocated from the process. In some implementations, the second subset of the paging space may be the same size as the first subset of the paging space. In another implementation, as will be described in FIG. 4, the content may be compressed before writing the content to the second subset of the paging space and therefore, the second subset of the paging space may be smaller than the first subset of the paging space. Furthermore, the second subset of the paging space may or may not be contiguous segments of the paging space. For example, a 32 KB segment of the paging space might be de-allocated from the process and two 16 KB segments of the paging space might be allocated to the process. The flow continues at block 210 in FIG. 2, where it is determined whether the contiguous unallocated pages of the second page size can be aggregated to form a page of the first page size.

The process is terminated to de-allocate the pages previously allocated to the process (226). The flow 200 moves from block 222 to block 226 on determining that the pages allocated to the process cannot be reorganized. In one implementation, the page allocation map can be analyzed to identify a number and size of pages allocated to each process executing on the computer system. A process to which a maximum number of pages (or a maximum amount of paging space) is allocated may be identified and may be preferentially terminated in an effort to de-allocate a maximum number of pages (i.e., de-allocate a maximum amount of paging space) while terminating a least number of processes. Prior to terminating the process, it may be determined whether the identified process can be terminated. For example, it may be determined whether pages allocated to the identified process or content generated by the identified process is being shared with other processes. If so, the identified process may not be terminated. As another example, it may be determined whether a flag associated with the identified process indicates that the identified process should not be terminated (e.g., because the identified process is a high priority process, etc.). As another example, the identified process may not be terminated if pages associated with the identified process were recently accessed. If the identified process is terminated, the pages previously allocated to the identified process are de-allocated. If the identified process cannot be terminated, another process (e.g., a process to which a next highest number of pages are allocated) may be identified for termination. The flow continues at block 210 in FIG. 2, where it is determined whether the contiguous unallocated pages of the second page size can be aggregated to form a page of the first page size.

Figure 4:
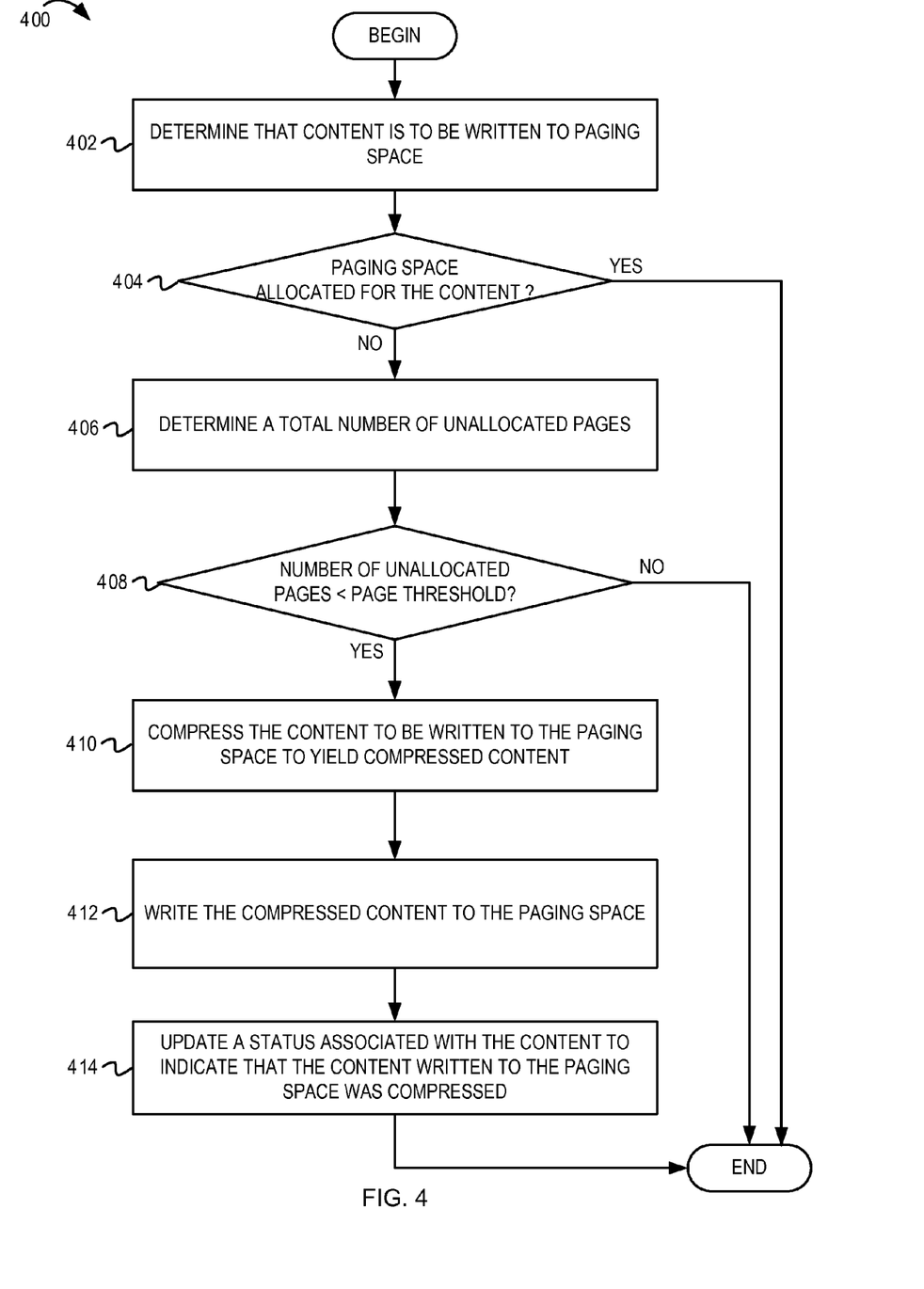
FIG. 4 is a flow diagram illustrating example operations for compressing content for page management in low paging space conditions.

FIG. 4 is a flow diagram illustrating example operations for compressing content for page management in low paging space conditions. Flow 400 begins at block 402.

It is determined that content is to be written to paging space (402). The content can comprise data generated by a process, instructions that constitute an instance of the process, etc. For example, the content may be written to the paging space to de-allocate physical memory currently allocated for storing the content. As another example, the content may be written to the paging space in response to determining that the content is stored in a subset of the paging space that is to be reorganized for de-allocating the subset of the paging space from the process (e.g., for obtaining contiguous unallocated paging space as described with reference to blocks 222 and 224 of FIG. 3). The flow continues at block 404.

It is determined whether paging space is already allocated for the content (404). In other words, it is determined whether the content to be written from the physical memory to the paging space already exists in the paging space. If it is determined that paging space is already allocated for the content, the content is written to the allocated paging space and the flow ends. Otherwise, the flow continues at block 406.

A total number of unallocated pages is determined (406). In one implementation, the total number of unallocated pages of each page size supported by an operating system may be determined. In another implementation, the total unallocated paging space may be determined. Because a page of a particular page size is typically mapped to paging space of the same page size, the total number of unallocated pages can serve as an indication of unallocated paging space. For example, if it is determined that there exist ten 64 KB unallocated pages and ten 4 KB unallocated pages, it may be assumed that there is 680 KB of unallocated paging space. The flow continues at block 408.

It is determined whether the number of unallocated pages is less than a page threshold (408). In one implementation, the number of unallocated pages of each page size supported by the operating system may be compared against a corresponding threshold. For example, in an operating system that supports a 64 KB page size and a 4 KB page size, the number of unallocated 64 KB pages may be compared against a first threshold and the number of unallocated 4 KB pages may be compared against a second threshold. In one implementation, operations described with reference to blocks 410-414 may be executed if the number of unallocated pages of each page size fall below their corresponding thresholds. In another implementation, the unallocated paging space (determined at block 406) may be compared against a paging space threshold. The content may be compressed before writing the content to the paging space (as will be described below) if the unallocated paging space is less than the paging space threshold. However, in some implementations, the content may not be compressed prior to writing the content to the paging space if the unallocated paging space is not less than the paging space threshold or if the number of unallocated pages is greater than or equal to the page threshold. If it is determined that the number of unallocated pages is less than the page threshold, the flow continues at block 410. Otherwise, the flow ends.

The content to be written to the paging space is compressed to yield compressed content (410). Any suitable memory compression algorithm (e.g., Lempel-Ziv-Welch (LZW) compression, Slepian-Wolf compression, etc.) can be implemented for compressing the content. The content to be written to the paging space may be compressed so that the compressed content can be written to a smaller segment of the paging space. For example, a 64 KB page (or 64 KB of the paging space) may be allocated to a process to write 64 KB of content generated by the process to the paging space. By compressing the content by at least a factor of 2, the compressed content generated after content compression may be 32 KB. Thus, only a 32 KB page (or 32 KB of the paging space) may be allocated to the process for writing 32 KB of the compressed content. The granularity of a virtual memory manager may be taken into consideration in determining whether to compress the content prior to writing the content to the paging space. For example, if the smallest page that can be allocated to a process is 4 KB, further compressing 4 KB of content prior to writing the content to the paging space will not result in a smaller number of pages being allocated to the process. However, if the smallest page that can be allocated to a process is 512 bytes, the 4 KB of content can be further compressed (e.g., to 512 bytes) prior to writing the content to the paging space so that a smaller number of pages or a smaller segment of the paging space (e.g., one 512 byte page instead of one 4 KB page) can be allocated to the process. The flow continues at block 412.

The compressed content is written to the paging space (412). The flow continues at block 414.

A status associated with the content is updated to indicate that the content written to the paging space was compressed (414). A flag associated with a page (or a corresponding segment of the paging space) can be updated to indicate that the content is compressed. Additionally, if the virtual memory manager supports multiple compression algorithms/compression ratios, other information such as a compression ratio, a compression algorithm employed, etc. can also be stored. From block 414, the flow ends.

It should be understood that the depicted diagrams (FIGS. 1-4) are examples meant to aid in understanding embodiments and should not be used to limit embodiments or limit scope of the claims. Embodiments may perform additional operations, fewer operations, operations in a different order, operations in parallel, and some operations differently. For example, it is noted that in reading content from the paging space to the physical memory, the virtual memory manager 102 determines whether the content being read from the paging space was previously compressed. Based on the number of pages that are to be read from the paging space to the physical memory and based on whether/how many pages comprise compressed content, the virtual memory manager 102 can determine an amount of the physical memory that is to be allocated for the content. For example, the virtual memory manager 102 may determine that content of a 32 KB page is to be read into the physical memory. The virtual memory manager 102 may also determine that the content of the 32 KB page was compressed and that the compression ratio is 0.5. Accordingly, the virtual memory manager 102 may determine that 64 KB of the physical memory is required to store the compressed content of the 32 KB page. As another example, the virtual memory manager 102 may be required to read multiple pages from the paging space to the physical memory. Some of the pages to be read into the physical memory may comprise compressed content while the other pages may comprise uncompressed content. The virtual memory manager 102 may accordingly determine a total amount of the physical memory required to read all of the pages into the physical memory. Depending on whether the page comprises compressed or uncompressed content, the virtual memory manager 102 may decompress the content before reading the content into the physical memory or may directly read the content into the physical memory.

Although FIGS. 1-4 describe the operating system supporting two page sizes—a first page size (e.g., a 64 KB page size) and a second page size (e.g., a 4 KB page size), embodiments are not so limited. In some implementations, the operating system can support any suitable number of page sizes. Accordingly, the first page size and the second page size referenced herein may vary depending on the number of page sizes supported by the operating system and the size of the page to be generated (after aggregation of smaller sized pages). For example, the operating system may support three page sizes—4 KB, 16 KB, and 64 KB. On determining that the number of unallocated 64 KB pages is less than the page threshold, the virtual memory manager 102 can attempt to identify and reorganize pages so that sixteen unallocated contiguous 4 KB pages are aggregated to form a 64 KB page. The virtual memory manager 102 can also attempt to identify and reorganize pages so that four unallocated contiguous 16 KB pages are aggregated to form a 64 KB page. The virtual memory manager 102 can also aggregate a combination of unallocated contiguous 4 KB pages and 16 KB pages (e.g., two 16 KB pages and eight 4 KB pages) to form a 64 KB page. Thus, with reference to FIGS. 2-3, the first page size may be 64 KB and the second page size may be 16 KB and/or 4 KB. Additionally, the virtual memory manager 102 may also aggregate four 4 KB pages to form a 16 KB page (e.g., to meet a second page threshold associated with the 16 KB page size). Thus, with reference to FIGS. 2-3, the first page size may be 16 KB and the second page size may be 4 KB.

It is also noted, although not described above, that the large-sized pages can be fragmented into smaller-sized pages for allocation to one or more processes (if required). For example, an operating system that supports a 64 KB page size and a 4 KB page size may receive a request for a 56 KB page from a process. In one implementation, the virtual memory manager 102 can allocate a 64 KB page to the process. In another implementation, the virtual memory manager 102 can fragment a 64 KB page into sixteen 4 KB pages and can allocate fourteen 4 KB pages to the process.

Lastly, it is noted that although FIG. 4 depicts the virtual memory manager 102 compressing the content only if the operating system is in a low paging space condition (e.g., the unallocated paging space is below a paging space threshold or the number of unallocated pages is less than a page threshold), in other embodiments, the virtual memory manager 102 may compress the content before writing the content to the paging space irrespective of whether the operating system is in a low paging space condition. In some implementations, the virtual memory manager may use different compression algorithms and/or different compression ratios depending on whether the operating system is in a low paging space condition.

As will be appreciated by one skilled in the art, aspects of the present inventive subject matter may be embodied as a system, method, or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
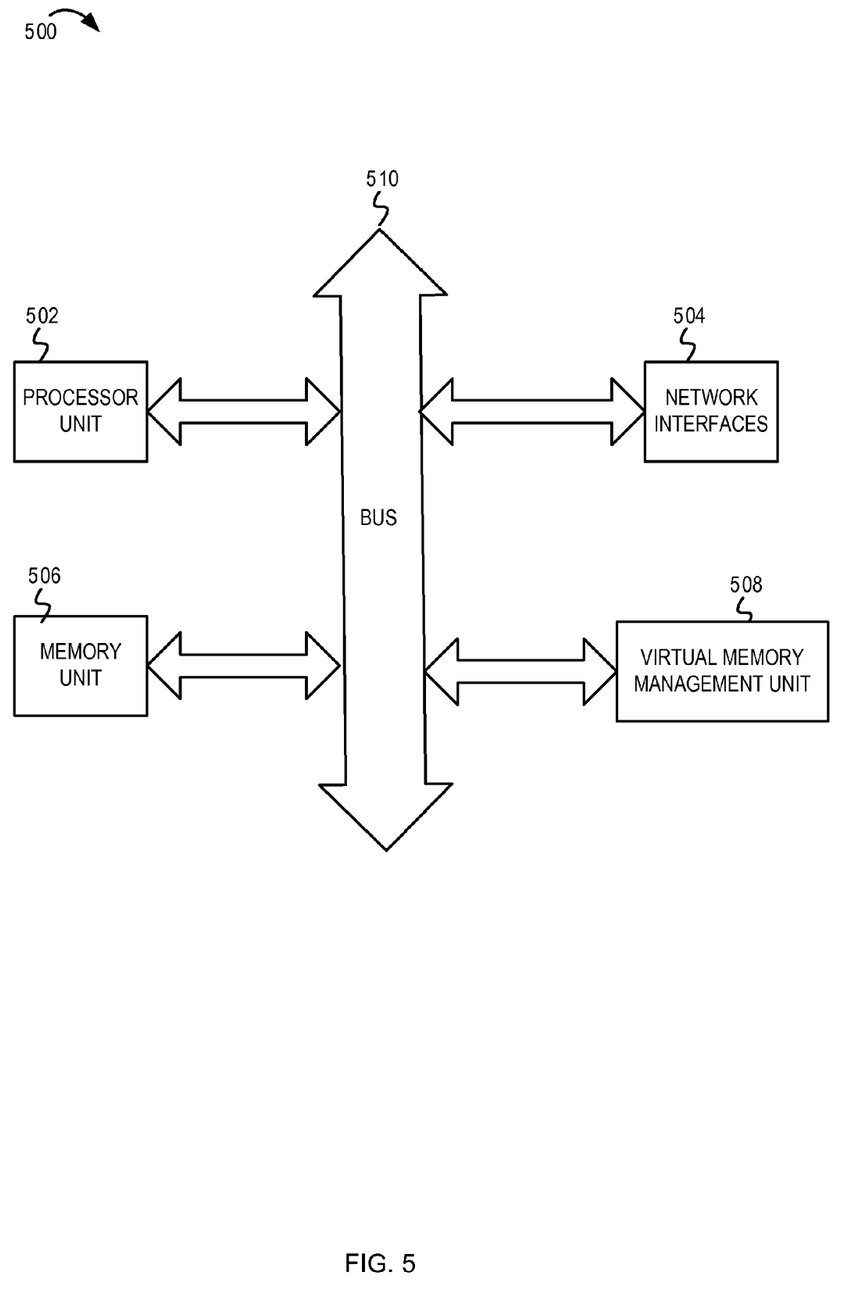
FIG. 5 is a block diagram of one embodiment of a computer system configured for page management in low paging space conditions.

FIG. 5 is a block diagram of one embodiment of a computer system configured for page management in low paging space conditions. In some implementations, the computer system 500 may be one of a personal computer (PC), a server, or other electronic system capable of virtual memory management. The computer system 500 includes a processor unit 502 (possibly including multiple processors, multiple cores, multiple nodes, and/or implementing multi-threading, etc.). The computer system 500 includes a memory unit 506. The memory unit 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 500 also includes a bus 510 (e.g., PCI, ISA, PCI-Express, HyperTransport®, InfiniBand®, NuBus, AHB, AXI, etc.), and network interfaces 504 that include one or more of a wireless network interface (e.g., a WLAN interface, a Bluetooth® interface, a WiMAX interface, a ZigBee® interface, a Wireless USB interface, etc.) and a wired network interface (e.g., an Ethernet interface).

The computer system 500 also includes a virtual memory management unit 508. The virtual memory management unit 508 executes operations described with reference to FIGS. 1-3 to reorganize paging space allocated to one or more process and to obtain contiguous unallocated paging space for generating large-sized pages. Furthermore, the virtual memory management unit 508 can also compress content prior to writing the content to the paging space, as described with reference to FIG. 4.

Any one of these functionalities may be partially (or entirely) implemented in hardware and/or on the processor unit 502. For example, the functionality may be implemented with an application specific integrated circuit, in logic implemented in the processor unit 502, in a co-processor on a peripheral device or card, etc. Further, realizations may include fewer or additional components not illustrated in FIG. 5 (e.g., video cards, audio cards, additional network interfaces, peripheral devices, etc.). The processor unit 502, the memory unit 506, and the network interfaces 506 are coupled to the bus 510. Although illustrated as being coupled to the bus 510, the memory unit 506 may be coupled to the processor unit 502.

While the embodiments are described with reference to various implementations and exploitations, it will be understood that these embodiments are illustrative and that the scope of the inventive subject matter is not limited to them. In general, techniques for to management of low paging space conditions in an operating system as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    determining that a number of unallocated pages of a first page size supported by an operating system is less than a page threshold, wherein the page threshold corresponds to insufficient unallocated paging space available to the operating system;
    determining that a first number of unallocated contiguous pages of a second page size supported by the operating system is less than a page conversion factor that indicates a number of pages of the second page size that is equivalent to one page of the first page size;
    identifying at least one process to which at least a second number of allocated pages of the second page size is allocated, wherein the second number corresponds to a difference between the page conversion factor and the first number, wherein the allocated pages are contiguous with the unallocated contiguous pages;

determining that content of a segment of paging space that corresponds to the allocated pages of the second page size is also present in physical memory;

de-allocating the segment of the paging space that corresponds to the allocated pages of the second page size from the at least one process; and aggregating the allocated pages of the second page size with the unallocated contiguous pages of the second page size to create at least a first unallocated page of the first page size.

2. The method of claim 1, further comprising:

determining that content is to be written from physical memory of a computer system that comprises the operating system to a first segment of the paging space; and compressing the content in the physical memory to fit within a second segment of the paging space that is smaller than the first segment of the paging space in response to at least one of said determining that the number of unallocated pages of the first page size supported by the operating system is less than the page threshold and determining that a number of unallocated pages of the second page size supported by the operating system is less than a second page threshold.

3. The method of claim 2, further comprising:

writing the compressed content from the physical memory to the second segment of the paging space that is smaller than the first segment of the paging space; and generating an indication that the content was compressed.

4. The method of claim 1, further comprising de-allocating the allocated pages from the at least one process.

5. The method of claim 1, further comprising:

identifying a second process to which at least a third number of allocated pages of the second page size is allocated, wherein the third number corresponds to a difference between the page conversion factor and the first number, wherein the allocated pages are contiguous with the unallocated contiguous pages;

determining that the third number of pages of the second page size cannot be reorganized to de-allocate the third number of pages of the second page size from the second process; and terminating the second process to de-allocate the third number of pages of the second page size.

6. The method of claim 1, wherein said de-allocating the segment of the paging space that corresponds to the allocated pages of the second page size from the at least one process comprises:

identifying a first segment of paging space that corresponds to a third number of unallocated pages of the second page size, wherein the third number of unallocated pages is equal to the allocated pages of the second page size;

reading, into physical memory of a computer system that comprises the operating system, content from a second segment of the paging space that corresponds to the allocated pages of the second page size;

allocating the third number of unallocated pages to the at least one process;

writing the content from the physical memory to the first segment of the paging space that corresponds to the third number of unallocated pages for said allocating the third number of unallocated pages to the at least one process; and deleting the content from the second segment of the paging space that corresponds to the allocated pages from the at least one process to de-allocate the second number of pages of the second page size from the at least one process.

7. The method of claim 1 further comprising:

updating a first indication of the number of unallocated pages of the first page size and a second indication of a number of unallocated pages of the second page size.

8. A computer program product for management of low paging space conditions, the computer program product comprising:

a computer readable storage medium having computer usable program code embodied therewith, the computer readable program code configured to:

determine that a number of unallocated pages of a first page size supported by an operating system is less than a page threshold, wherein the page threshold corresponds to insufficient unallocated paging space available to the operating system;

determine that a first number of unallocated contiguous pages of a second page size supported by the operating system is less than a page conversion factor that indicates a number of pages of the second page size that is equivalent to one page of the first page size;

identify at least one process to which at least a second number of allocated pages of the second page size is allocated, wherein the second number corresponds to a difference between the page conversion factor and the first number, wherein the allocated pages are contiguous with the unallocated contiguous pages;

determine that content of a segment of paging space that corresponds to the allocated pages of the second page size is also present in physical memory;

de-allocate the segment of the paging space that corresponds to the allocated pages of the second page size from the at least one process; and aggregate the allocated pages of the second page size with the unallocated contiguous pages of the second page size to create at least a first unallocated page of the first page size.

9. The computer program product of claim 8, wherein the computer usable program code is further configured to:

determine that content is to be written from physical memory of a computer system that comprises the operating system to a first segment of the paging space; and compress the content in the physical memory to fit within a second segment of the paging space that is smaller than the first segment of the paging space in response to at least one of the computer usable program code determining that the number of unallocated pages of the first page size supported by the operating system is less than the page threshold and the computer usable program code determining that a number of unallocated pages of the second page size supported by the operating system is less than a second page threshold.

10. The computer program product of claim 9, wherein the computer usable program code is further configured to:

write the compressed content from the physical memory to the second segment of the paging space that is smaller than the first segment of the paging space.

11. The computer program product of claim 8, wherein the computer usable program code configured to de-allocate the segment of the paging space that corresponds to the allocated pages of the second page size from the at least one process comprises the computer usable program code configured to:

identify a first segment of paging space that corresponds to a third number of unallocated pages of the second page size, wherein the third number of unallocated pages is equal to the allocated pages of the second page size;

read, into physical memory of a computer system that comprises the operating system, content from a second segment of the paging space that corresponds to the allocated pages of the second page size;

allocate the third number of unallocated pages to the at least one process;

write the content from the physical memory to the first segment of the paging space that corresponds to the third number of unallocated pages for the computer readable program code to allocate the third number of unallocated pages to the at least one process; and delete the content from second segment of the paging space that corresponds to the allocated pages from the at least one process to de-allocate the second number of pages of the second page size from the at least one process.

12. A computer program product for management of low paging space conditions, the computer program product comprising:

a computer readable storage medium having computer usable program code embodied therewith, the computer readable program code configured to:

determine that a number of unallocated pages of a first page size supported by an operating system is less than a page threshold, wherein the page threshold corresponds to insufficient unallocated paging space available to the operating system;

determine that a first number of unallocated contiguous pages of a second page size supported by the operating system is less than a page conversion factor that indicates a number of pages of the second page size that is equivalent to one page of the first page size;

identify at least one process to which at least a second number of allocated pages of the second page size is allocated, wherein the second number corresponds to a difference between the page conversion factor and the first number, wherein the allocated pages are contiguous with the unallocated contiguous pages;

reorganize the allocated pages of the second page size to de-allocate the allocated pages from the at least one process;

aggregate the allocated pages of the second page size with the unallocated contiguous pages of the second page size to create at least a first unallocated page of the first page size;

determining that content is to be written from physical memory to a first segment of the paging space, wherein the paging space comprises hard disk space;

compressing the content in the physical memory to fit within a second segment of the paging space that is smaller than the first segment of the paging space in response to at least one of said determining that the number of unallocated pages of the first page size supported by the operating system is less than the page threshold and determining that a number of unallocated pages of the second page size supported by the operating system is less than a second page threshold;

writing the compressed content from the physical memory to the second segment of the paging space that is smaller than the first segment of the paging space.

13. The computer program product of claim 12, wherein the computer usable program code configured to reorganize the allocated pages of the second page size to de-allocate the allocated pages from the at least one process comprises the computer usable program code configured to:

determine that content of a segment of paging space that corresponds to the allocated pages of the second page size is also present in physical memory of a computer system that comprises the operating system; and de-allocate the segment of the paging space that corresponds to the allocated pages of the second page size from the at least one process.

14. The computer program product of claim 12, wherein the computer usable program code configured to reorganize the allocated pages of the second page size to de-allocate the allocated pages from the at least one process comprises the computer usable program code configured to:

identify a first segment of paging space that corresponds to a third number of unallocated pages of the second page size, wherein the third number of unallocated pages is equal to the allocated pages of the second page size;

read, into physical memory of a computer system that comprises the operating system, content from a second segment of the paging space that corresponds to the allocated pages of the second page size;

allocate the third number of unallocated pages to the at least one process;

write the content from the physical memory to the first segment of the paging space that corresponds to the third number of unallocated pages for the computer readable program code to allocate the third number of unallocated pages to the at least one process; and delete the content from second segment of the paging space that corresponds to the allocated pages from the at least one process to de-allocate the second number of pages of the second page size from the at least one process.

15. A system comprising:

a processor;

a network interface coupled with the processor;

a virtual memory management unit coupled with the network interface and the processor, the virtual memory management unit operable to:

determine that a number of unallocated pages of a first page size supported by an operating system is less than a page threshold, wherein the page threshold corresponds to insufficient unallocated paging space available to the operating system;

determine that a first number of unallocated contiguous pages of a second page size supported by the operating system is less than a page conversion factor that indicates a number of pages of the second page size that is equivalent to one page of the first page size;

identify at least one process to which at least a second number of allocated pages of the second page size is allocated, wherein the second number corresponds to a difference between the page conversion factor and the first number, wherein the allocated pages are contiguous with the unallocated contiguous pages;

determine that content of a segment of paging space that corresponds to the allocated pages of the second page size is also present in physical memory;

de-allocate the segment of the paging space that corresponds to the allocated pages of the second page size from the at least one process; and aggregate the allocated pages of the second page size with the unallocated contiguous pages of the second page size to create at least a first unallocated page of the first page size.

16. The system of claim 15, wherein the virtual memory management unit is further operable to:

determine that content is to be written from physical memory of the system that comprises the operating system to a first segment of paging space; and compress the content in the physical memory to fit within a second segment of the paging space that is smaller than the first segment of the paging space in response to at least one of the virtual memory management unit determining that the number of unallocated pages of the first page size supported by the operating system is less than the page threshold and the virtual memory management unit determining that a number of unallocated pages of the second page size supported by the operating system is less than a second page threshold.

17. The system of claim 15, wherein the virtual memory management unit comprises a computer readable storage medium.

* * * * *